United States Patent
Gower

(10) Patent No.: US 6,886,299 B2
(45) Date of Patent: May 3, 2005

(54) BLAST CURTAIN

(75) Inventor: Ted Gower, North Palm Beach, FL (US)

(73) Assignee: Targus International, Inc., Palm Beach Gardens, FL (US)

( * ) Notice: Subject to any disclaimer, the term of this patent is extended or adjusted under 35 U.S.C. 154(b) by 150 days.

(21) Appl. No.: 10/146,094

(22) Filed: May 14, 2002

(65) Prior Publication Data

US 2003/0127122 A1 Jul. 10, 2003

Related U.S. Application Data

(63) Continuation-in-part of application No. 09/565,211, filed on May 4, 2000, now Pat. No. 6,325,085, which is a continuation of application No. 09/270,249, filed on Mar. 15, 1999, now Pat. No. 6,176,050, which is a continuation-in-part of application No. 08/861,209, filed on May 21, 1997, now abandoned.

(51) Int. Cl.$^7$ ................................................. F41H 5/00
(52) U.S. Cl. .................. 52/222; 52/DIG. 12; 52/741.3; 52/167.1; 52/750; 256/45; 102/303; 160/368.1
(58) Field of Search .......................... 52/3, 4, 23, 741.3, 52/DIG. 12, 63, 222, 146, 147, 152, 167.1, 750; 256/45; 102/303; 160/327, 354, 368.1

(56) References Cited

U.S. PATENT DOCUMENTS

| | | | |
|---|---|---|---|
| 1,106,624 A | * | 8/1914 | Cadwallader et al. |
| 2,237,106 A | * | 4/1941 | Minert |
| 2,465,936 A | * | 3/1949 | Schultz |
| 3,001,795 A | * | 9/1961 | Johnson, Jr. ............... 473/197 |
| 3,480,069 A | * | 11/1969 | Handwerker |
| 3,805,816 A | | 4/1974 | Nolte |
| 3,862,876 A | | 1/1975 | Graves |

(Continued)

FOREIGN PATENT DOCUMENTS

| | | | |
|---|---|---|---|
| JP | 411152935 A | * 6/1999 | ............. E04H/9/04 |

OTHER PUBLICATIONS 1 page from Urban Journal found during a google search titled Designing Blast Protection, disuccses blast curtain materials, Date unknown. 11 pages, AMPTIAC Quarterly, vol. 6, No. 4, Protecting People at Risk, date unknown.*
1 page, last updated Jun. 1, 2001 titled Flying Debris/ Terrorist Blast Protective Dispensable Structural Shield from California State University, Northridge College of Engineering and Computer Sciences Department of Civil and Manufacturing Engineering.*
12 pages, WBDG, retrofitting Existing Buildings to Resist Explosvze Threats, Jun. 2003. 1 page, Safetydrape by Mitigation Technologies, date unknown.*
6 pages, Hurricane Screens, the Armor Screen Hurricane Protection System, see aprticularly Airport Entrance Protection, date unknown.*

*Primary Examiner*—Robert Canfield
(74) *Attorney, Agent, or Firm*—McHale & Slavin, P.A.

(57) ABSTRACT

A flexible blast curtain will reduce casualties and property damage in the event of a terrorist bombing by intercepting flying debris and dissipating over pressure through deflection of the curtain. The blast curtain may be attached directly to buildings or mounted on frames anchored in close proximity to buildings. The curtain provides complete visibility and easy pedestrian ingress and egress for the buildings.

16 Claims, 4 Drawing Sheets

U.S. PATENT DOCUMENTS

| | | | |
|---|---|---|---|
| 3,922,822 A | * 12/1975 | Mollinger | 52/63 |
| 3,949,527 A | 4/1976 | Double | |
| 4,259,819 A | 4/1981 | Wemyss | |
| 4,283,888 A | 8/1981 | Cros | |
| 4,290,243 A | 9/1981 | Mellin | |
| 4,432,381 A | * 2/1984 | Greenbaum | 135/87 |
| 4,487,212 A | 12/1984 | Moore | |
| 4,590,714 A | 5/1986 | Walker | |
| 4,730,423 A | * 3/1988 | Hughes | 135/87 |
| 4,848,386 A | 7/1989 | Cooper | |
| 4,858,395 A | 8/1989 | McQuirk | |
| 5,076,168 A | 12/1991 | Yoshida et al. | |
| 5,174,073 A | 12/1992 | Sabo | |
| 5,197,239 A | * 3/1993 | Glynn et al. | |
| 5,201,152 A | * 4/1993 | Heffner | |
| 5,226,262 A | * 7/1993 | Kelley | 52/63 X |
| 5,319,896 A | 6/1994 | Winger | |
| 5,347,768 A | 9/1994 | Pineda | |
| 5,394,927 A | * 3/1995 | Huebner | |
| 5,406,764 A | * 4/1995 | Van Auken et al. | |
| 5,435,524 A | * 7/1995 | Ingram | |
| 5,502,929 A | * 4/1996 | Daniels | 52/69 |
| 5,522,165 A | 6/1996 | Molla | |
| 5,522,184 A | 6/1996 | Oviedo-Reyes | |
| 5,531,239 A | 7/1996 | Hannah | |
| 5,535,565 A | 7/1996 | Majnaric | |
| 5,579,794 A | 12/1996 | Sporta | |
| 5,687,512 A | 11/1997 | Spoozak et al. | |
| 5,791,090 A | * 8/1998 | Gitlin et al. | |
| 5,799,680 A | * 9/1998 | Dorflinger | |
| 5,862,637 A | * 1/1999 | Bruce | 52/147 |
| 5,915,449 A | 6/1999 | Schwartz | |
| 5,966,877 A | * 10/1999 | Hawes | 52/63 |
| 6,076,448 A | * 6/2000 | Rexroad | |
| 6,088,975 A | * 7/2000 | Wiegel | |
| 6,161,339 A | 12/2000 | Cornett | |
| 6,176,050 B1 | 1/2001 | Gower | |
| 6,212,840 B1 | * 4/2001 | Davidovitz | 160/327 X |
| 6,226,945 B1 | * 5/2001 | Henry et al. | |
| 6,230,455 B1 | 5/2001 | Arehart | |
| 6,298,766 B1 | 10/2001 | Mor | |
| 6,325,085 B1 | * 12/2001 | Gower | |
| 6,412,540 B2 | * 7/2002 | Hendee | 160/327 |
| 6,453,621 B1 | * 9/2002 | Bundy, Jr. et al. | |

* cited by examiner

BLAST CURTAIN

RELATED APPLICATIONS

This application is a continuation-in-part of Ser. No. 09/565,211, filed May 4, 2000 now U.S. Pat. No. 6,325,085, which is a continuation of Ser. No. 09/270,249, filed Mar. 15, 1999 and now U.S. Pat. No. 6,176,050 B1 issued Jan. 23, 2001 which is a continuation-in-part of Ser. No. 08/861,209, filed May 21, 1997, now abandoned. The content of all the prior applications and the prior art cited therein is incorporated herein by reference.

FIELD OF THE INVENTION

This invention relates to flexible protective barriers which may be temporarily or permanently erected to protect buildings and occupants or other structures from the effects of high velocity winds or shock waves, with associated debris, resulting from explosive blasts.

BACKGROUND OF THE INVENTION

The continuing increase in terrorist attacks which rely on explosives delivered by humans or vehicles, including cars, trucks, boats, and airplanes, into or adjacent to a target requires protective measures to be in place to diminish the number of casualties and minimize property damage. Since the U.S. embassy bombings, as well as the government building in Oklahoma City, and now the World Trade Center in New York, emphasis has been placed on creating an impassable perimeter around the buildings.

However, these perimeters interrupt or dislocate the normal ingress and egress of the buildings and result in a "bunker" attitude. For example, some airports now prohibit parking within 300 feet of the terminal building. There have been suggestions to close off Pennsylvania Avenue in front of the White House, one of the main corridors in downtown Washington, D.C., with concrete barriers.

At least one prevalent attitude suggests that if a free and open life style must be changed for protection, the terrorists have won. No doubt, new construction and new materials will address this new situation. But the vast majority of public buildings were built before this threat was recognized and should be retro-fitted for the current situation without giving up utility and convenience. Such retro-fitting must be done quickly and economically.

DESCRIPTION OF THE PRIOR ART

U.S. Pat. No. 5,076,168 to Yoshida et al discloses a shielding fabric sheet for blasting operations. The fabric is made of a polyethylene fiber with a tensile strength of about 15 g/d, a tensile modulus of about 400 g/d and a total denier of about 600 and a weight of about 130 g/m.supp.2. The fabric can be used alone or laminated with another mesh. The material is used to cover an area or surround and area to be explosively demolished to contain the by-products of an explosion.

U.S. Pat. No. 5,915,449 to Schwartz discloses a bomb blast curtain to be installed over windows inside a building. The curtain has a specific mounting structure and such dimensions that it will expand to respond to the over pressure of a blast and contain the broken glass. The burst strength of the fabric is approximately 110 lbs. and the weight is approximately 4.2 oz/linear yd.

U.S. Pat. No. 6,176,050 to Gower discloses a fabric hurricane barrier for protecting property against the effects of high winds and foreign objects carried by the wind. The material is made of polypropylene yarns with an interstice size as small as 3/16th inch to prevent passage of objects and a burst strength of about 675 lbs after an elongation of about 22%.

U.S. Pat. No. 6,298,766 to Mor discloses a protective apparatus for glass panels having a plurality of spaced slender tensile elements, much like vertical Venetian blinds, installed inside a room. The elements may be woven or solid and made from a variety of materials. The opposite ends of the elements are mounted on a frame that may be adjusted to provide a desired degree of tension to the elements. The elements contain the effects of a blast.

Each of the prior art devices must be deployed continuously to insure adequate protection and therefore, each restricts the utility of the protected building by closing off all or parts of the structure.

What is needed in the art is a system that provides continuous protection while permitting conventional use of the structure and can be installed quickly and economically.

SUMMARY OF THE INVENTION

Accordingly, it is an objective of the instant invention to teach the use of a flexible blast curtain with separate panels erected outside a building in such a manner to allow normal ingress and egress, as well as visibility.

It is a further objective of the instant invention to teach mounting the fabric panels on the protected building or on frames adjacent the building in an architecturally pleasing array. This invention does not have rigidity but rather is very flexible, which gives several positive features including allowing for ease of storage as by rolling or folding. The flexible barrier of the invention is placed a distance out from the surface to be protected. An impacting missile stretches the barrier until it decelerates to a stop or is deflected. The barrier material has a predetermined tensile strength and stretch that makes it suitable for this application. The known strength and stretch, together with the speed, weight and size of the impacting missile, all of which are given in test requirements, permit design calculation to ascertain barrier deflection at impact. This deflection is a determinate of the minimum distance that this barrier is to be spaced out from the frangible area to be protected. Other determinates which may be included are additional deflection from wind pressure and from slack from an improper installation.

The barrier of this invention is mounted farther away from the surface to be protected than the prior art structures, thereby providing room for a longer deceleration of impacting flying debris (missiles). Thus greater energy from a missile can be safely dissipated than is possible with the prior art structures, and the energy which can be safely dissipated is calculable.

The distance which the barrier is spaced out from the frangible surface need not be great and is quite workable with standard building design. Even though the distance is not great, said distance does allow a significantly increased distance and time of deceleration such that the barrier will stop far stronger impacts than with the heretofore known rigid devices. In simple terms, the missile is slowed to a stop by elasticity as the barrier stretches. The greater the impact, the greater the stretch. Thus the building is not subjected to an abrupt harsh blow as the impact on a barrier is transferred to the building. The energy transfer is much gentler and less destructive than with the rigid devices.

It is yet another objective of the instant invention to teach constructing and installing blast curtains quickly and inexpensively.

It is a still further objective of the invention to teach the use of an attachment system that will absorb and dissipate the over pressure or wind of a blast without damage to the curtain.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
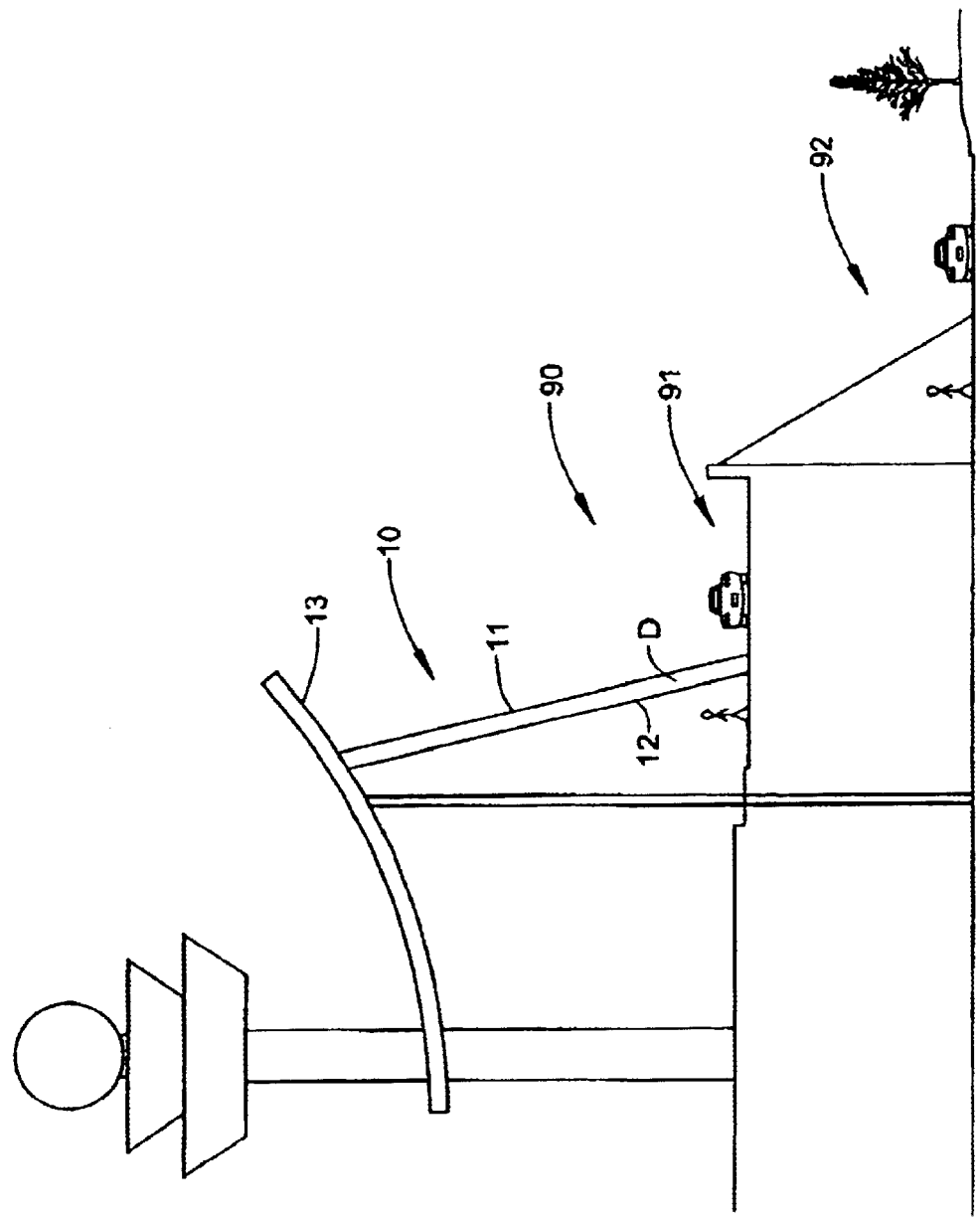
FIG. 1 illustrates a partial end view of an airport terminal building with the blast curtain of this invention in place.

FIG. 1 shows a cross section of a two story terminal building 90 having an upper level departure area 91 and a lower level arrival area 92. Both the upper level and lower level have multilane roadways for delivery and pick up of passengers. A blast curtain 10 has staggered panels 11 and 12 attached to the roof 13 of the terminal and extending along the entire front of the building. The number of panels necessary to cover any building would vary depending on the size of the building and the particular construction of the curtain 10. The distance D between the staggered panels is sufficient to allow a high volume of people and baggage carts free access to the entrances of an airport terminal, for example. When more than two panels are used, alternate panels are staggered creating parallel sets of panels. Variations of this embodiment include placement of the panels within the interior section of the building or in the doorway.

The use of this invention allows very large areas with spans of greater than 25 feet to be covered with ease. Thus most window groupings, even several stories of a building, could be readily protected. This invention is light in weight, easy to use, does not require reinforcing bars, can be constructed in varying degrees of transparency, can be weather tight, is economical, and is capable of dissipating far greater forces without damage than mechanical barriers. Missiles striking this barrier make very little sound. Additionally, the blast curtain is suitable to be configured with the necessary motor and supportive devices for automatic deployment.

Figure 2:
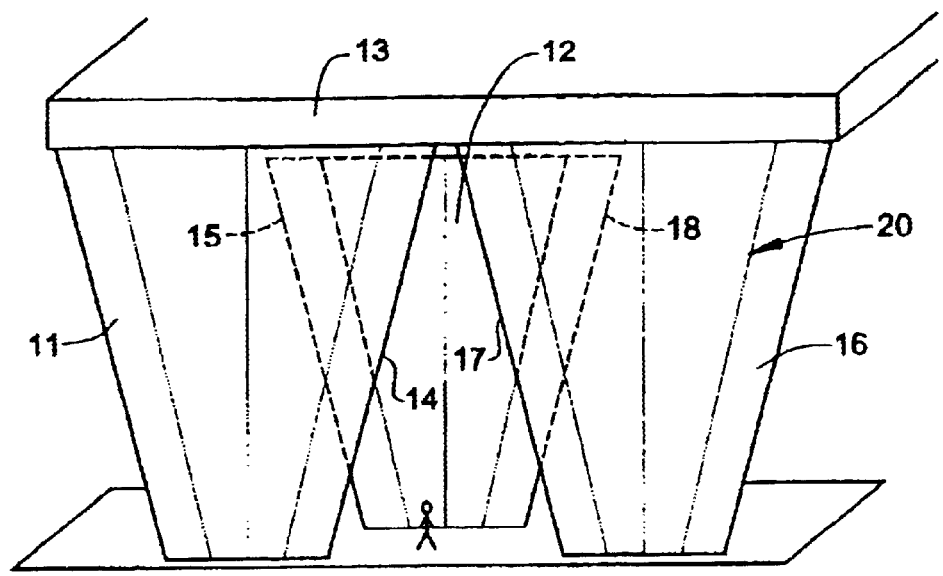
FIG. 2 shows a frontal view of FIG. 1.

As shown in FIG. 2, the lateral edge 14 of the panel 11 and the lateral edge 15 of panel 12 overlap to the extent that a missile would be required to abruptly change direction of flight to avoid hitting one or the other of the panels. The next successive panel 16 is in line with panel 11 and lateral edge 17 overlaps lateral edge 18 of panel 12. Each of the lateral edges of parallel panels is overlapped in this manner to provide complete coverage of one side of the building. Because a blast generally propagates equally in all directions, debris is projected outwardly in straight lines and would impinge on one of the overlapped panels.

Figure 3:
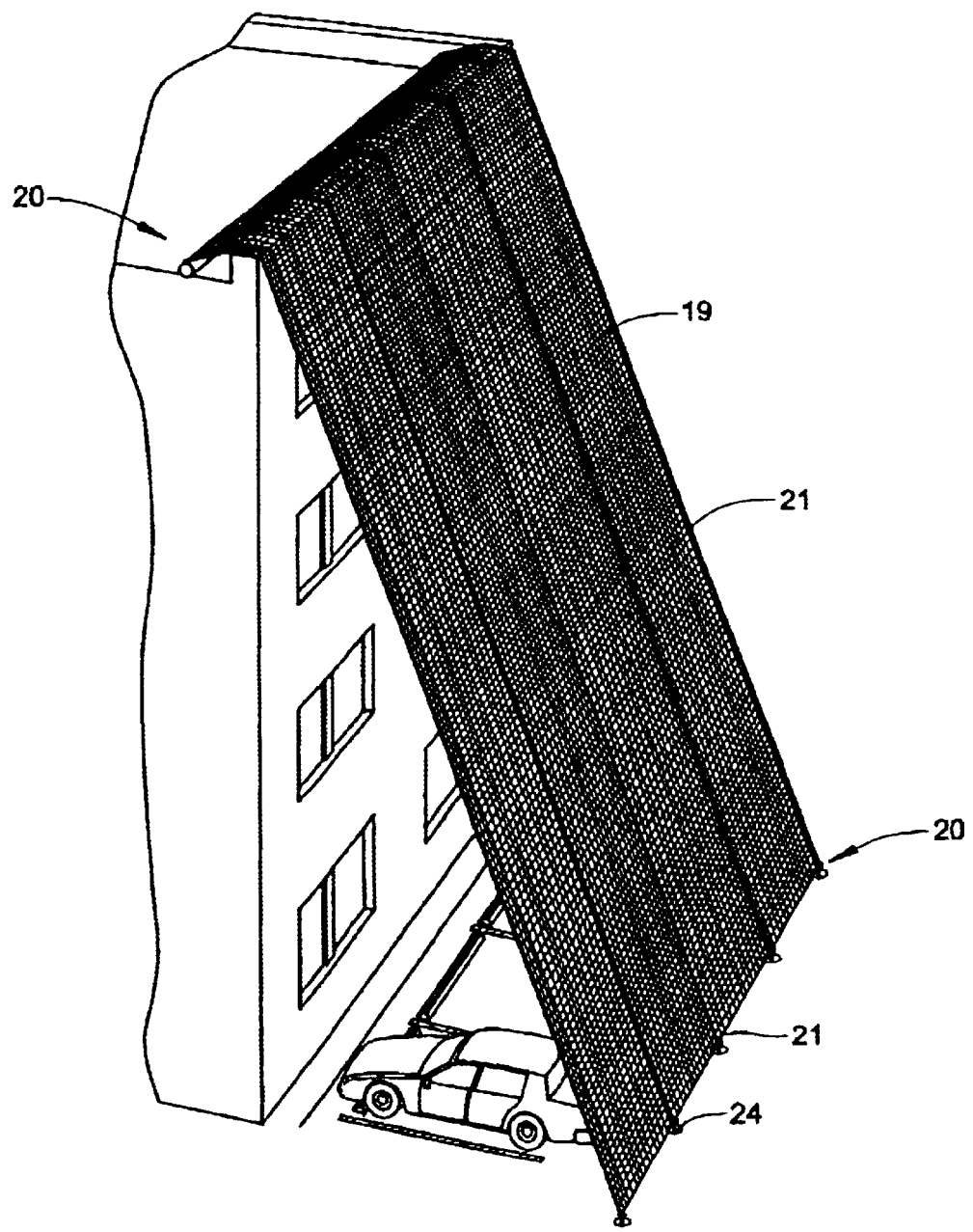
FIG. 3 shows a perspective of one panel of the blast curtain with attachments.
Figure 4:
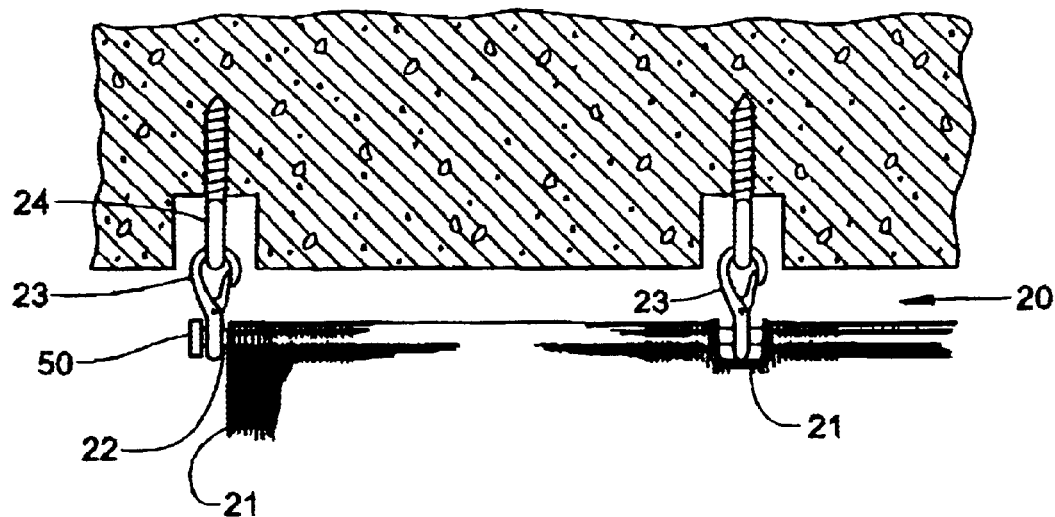
FIG. 4 shows one embodiment of an attachment assembly.

The blast curtain 10 is mounted to the building in the area which affords the strongest connection between the curtain and the building. Where there is a structural overhang, the curtain may be mounted as shown in FIG. 1. FIG. 3 shows a curtain having a panel 19 with an attachment assembly 20 connected to the roof of a building behind a facade. The attachment assembly is made up reinforcement in the form of shock cords 21 spaced along the width of the panel and extending from end to end. The edges of the panels are hemmed and may also contain a shock cord. The shock cords may be elastic or inelastic material. They may be woven into the fabric or laced through the fabric. In one embodiment, shown in FIG. 4, the hem carries a batten, bar or rod 22 as part of the attachment assembly. The rod 22 is connected to shackles 23. The rod 22 has a stop 50 to prevent disassembly. The shackles are connected to anchors 24 to complete the attachment assembly. The anchors 24 may be embedded in concrete for a ground mount or fixed permanently to a structural member of a building.

Figure 5:
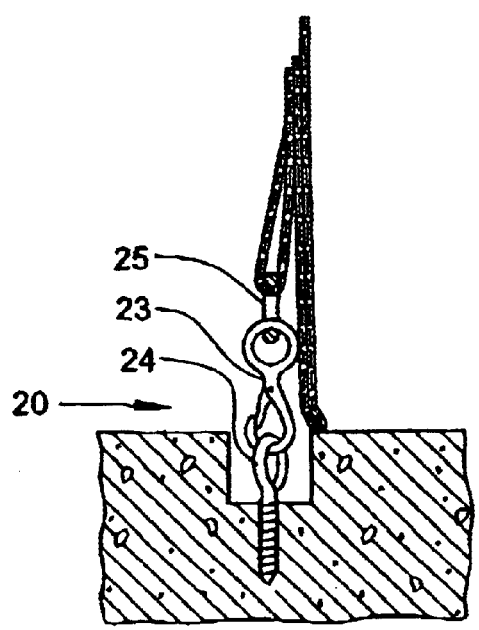
FIG. 5 shows another embodiment of an attachment assembly.

In FIG. 5, the attachment assembly includes a ring 25 connecting the looped end of a shock cord 21 and a shackle 23. The hem of the curtain extends beyond the end of the shock cord to protect the attachment assembly.

The panels are made of fabric and may have an adjustable porosity to enable some energy and light to pass through the curtain. This raises the total over pressure the curtain can survive and permits visibility through the curtain. The material of the curtain can withstand an over pressure of a least 700 psi. The attachment assembly is constructed to perform to the same standard. The curtain may be tailored to a particular strength by using multiple layers of fabric or different material constructions, including films and meshes. The fabrics could be made from polymers, such as polyethylene, polypropylene, etc., including Kevlar, or other high strength compositions, such as metals, and mixtures thereof. One embodiment allows an upwind pressure of 1" of mercury, which roughly translates into a 100 mph wind, through at 250 cfm or approximately 3 mph. The amount of air passage depends on the interstice size.

Figure 6:
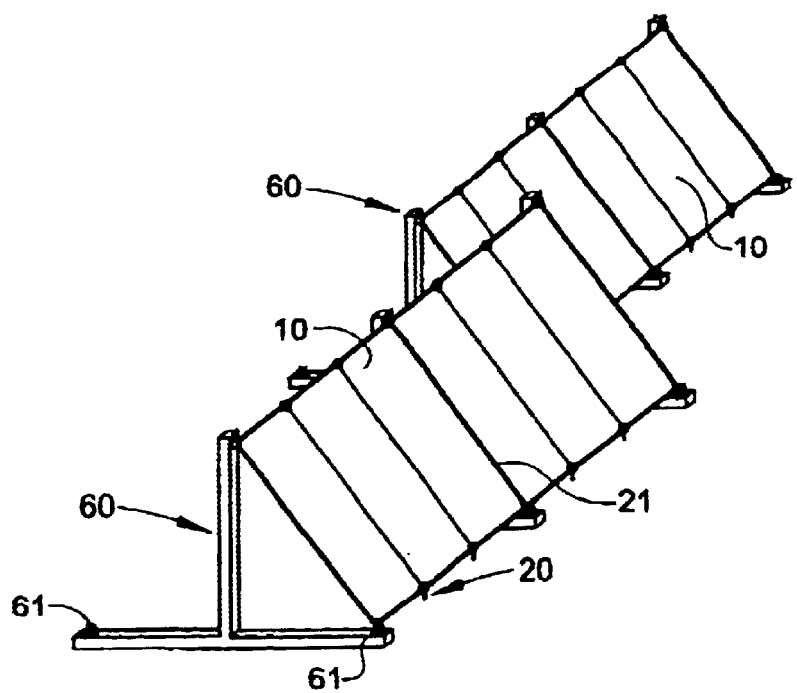
FIG. 6 shows a perspective of a blast curtain mounted on a frame.

In some instances because of the construction of the building and/or the physical layout of the plant, attachment to the building may be impractical. Therefore, the blast curtain 10 may be installed on frames 60, as shown in FIG. 6, using the attachment assembly 20. The frames 60 have anchors 61 for emplacement. As shown, the frames 60 are T-shaped but other shapes may be used, eg. an upside down Y. Also, the frames may be rectangular in shape and mounted on a building by horizontal spacer beams. The spacing is calculated as follows:

1) The fabric must be sufficiently strong that the impact force it is required to withstand is less than the failure force (Mullen Burst).
2) The impact (test) force is then divided by the force required to cause failure (Mullen Burst). This quotient is then multiplied by the known stretch at failure to obtain the stretch factor. A woven polypropylene synthetic fabric of the type used in the one embodiment stretch 20–22% just prior to failure, depending on manufacturing technique. This stretch information is available from the manufacturer.
3) The actual stretch measurement is then calculated and in conjunction with the span of the barrier used to ascertain the maximum deflection. This maximum deflection is the minimum distance the barrier should be spaced from the frangible object being protected.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A blast curtain for confining debris and dissipating the force of an over pressure comprising a flexible barrier means for decelerating missiles by deflection, said barrier means including a discrete panel adapted to be suspended from a building, said panel having a failure force of at least about 700 psi, said panel adapted to deflect a known distance before failure.

2. A blast curtain of claim 1 wherein said panel has contiguous top, bottom and opposite side edges, said top edge adapted to be attached to said building.

3. A blast curtain of claim 2 wherein said panel is a fabric, said panel having an attachment assembly, said attachment assembly including panel reinforcement connected to shackles on said top edge and anchors on said bottom edge.

4. A blast curtain for confining debris and dissipating the force of an over pressure comprising a flexible barrier means for decelerating missiles by deflection including a discrete panel adapted to be suspended from a building, said panel being flexible and having a failure strength and a deflection distance, said panel adapted to be suspended at a distance from said building greater than the deflection distance wherein said barrier means includes a plurality of said discrete panels, each of said discrete panels having a periphery composed of a bottom edge, a top edge and opposite side edges, said side edges of each panel of said plurality of said panels being overlapped with said side edges of an adjacent panel.

5. A blast curtain of claim 4 wherein said plurality of discrete panels are adapted to be attached at said top edges to said building and adapted to be anchored to the ground at said bottom edges.

6. A blast curtain of claim 5 wherein alternating panels of said plurality of discrete panels are adapted to be attached in staggered array to form parallel rows of discrete panels, said parallel rows spaced apart to allow pedestrian ingress and egress.

7. A blast curtain of claim 6 wherein each of said plurality of panels has interstices, each of said plurality of panels has reinforcements, said reinforcements including shackles at said top edge and anchors at said bottom edge.

8. said blast curtain further comprises a free standing frame adapted to be anchored to the ground adjacent a building, said discrete panel attached to said frame.

9. A blast curtain of claim 8 including a plurality of frames, said frames oriented in at least two staggered parallel rows, said staggered rows arranged such that said side edges of said panels are adapted to overlap.

10. A blast curtain of claim 1 wherein multiple spaced apart panels form said blast curtain.

11. A blast curtain of claim 1 wherein said panel includes multiple layers of fabric in each said panel.

12. A blast curtain of claim 4 wherein multiple spaced apart panels form said blast curtain.

13. A blast curtain of claim 4 wherein said panel includes multiple layers of fabric in each said panel.

14. A blast curtain of claim 8 wherein multiple spaced apart panels form said blast curtain.

15. A blast curtain of claim 8 wherein said panel includes multiple layers of fabric in each said panel.

16. A blast curtain of claim 8 wherein said frame includes a base for supporting said frame on the ground, said base having an anchoring means, a panel holder attached to said base and normal thereto attached to said panel.

* * * * *